United States Patent
Al Harthi

(10) Patent No.: US 11,585,166 B2
(45) Date of Patent: Feb. 21, 2023

(54) POWER TONG GEAR SHIFT SYSTEMS AND METHODS

(71) Applicant: Saudi Arabian Oil Company, Dhahran (SA)

(72) Inventor: Amer Hamoud Al Harthi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 428 days.

(21) Appl. No.: 16/777,712

(22) Filed: Jan. 30, 2020

(65) Prior Publication Data

US 2021/0239206 A1    Aug. 5, 2021

(51) Int. Cl.
*E21B 19/16*    (2006.01)
*F16H 61/22*    (2006.01)

(52) U.S. Cl.
CPC .......... *E21B 19/165* (2013.01); *E21B 19/161* (2013.01); *F16H 61/22* (2013.01)

(58) Field of Classification Search
CPC ....... E21B 19/161; E21B 19/165; F16H 61/22
See application file for complete search history.

(56) References Cited

U.S. PATENT DOCUMENTS

| 2,108,971 | A | * | 2/1938 | Olsen | E21B 19/16 |
| | | | | | 81/462 |
| 3,330,164 | A | | 7/1967 | Wilson | |
| 4,125,040 | A | * | 11/1978 | True | E21B 19/16 |
| | | | | | 73/862.25 |
| 6,446,524 | B1 | * | 9/2002 | Gravouia | F16H 57/02004 |
| | | | | | 81/57.33 |
| 7,717,014 | B2 | | 5/2010 | Carstensen | |
| 8,215,196 | B2 | | 7/2012 | Buck et al. | |
| 2011/0088495 | A1 | * | 4/2011 | Buck | F16H 3/30 |
| | | | | | 74/335 |
| 2020/0300374 | A1 | * | 9/2020 | Milne | E21B 34/06 |

OTHER PUBLICATIONS

Eckel [online] "22 Hydra-Shift HS-80," copyrighted 2018, retrieved Oct. 7, 2019, from URL <http://www.eckel.com/en/22hs-80.html>, 1 page.
TFWvalve.com [online] "Through shaft with pin butterfly valve," copy-righted 2015, retrieved on Oct. 7, 2019, from URL <http://wwws.tfwvalve.com/product/info-7.html>, 2 pages.
PCT International Search Report and Written Opinion in International Appln. No. PCT/US2021/015754, dated Jul. 15, 2021, 13 pages.

* cited by examiner

*Primary Examiner* — Christopher J Sebesta
(74) *Attorney, Agent, or Firm* — Fish & Richardson P.C.

(57) ABSTRACT

A power tong locking system includes a gear assembly with an aperture formed to receive a head shaft of a power tong gear shift system. The gear assembly includes discrete positions defined by notches formed between adjacent teeth arranged on a perimeter of the gear assembly. The power tong locking system further includes a lock arm assembly that includes a shift handle that includes an aperture formed to receive the head shaft of the power tong gear shift system adjacent the gear assembly, and a release handle rotatably coupled to the shift handle. The lock arm assembly is movable between a first position in which the release handle is secured in a first position to lock the power tong gear shift system at a first gear setting and a second position to lock the power tong gear shift system at a second gear setting that is different than the first gear setting.

21 Claims, 3 Drawing Sheets

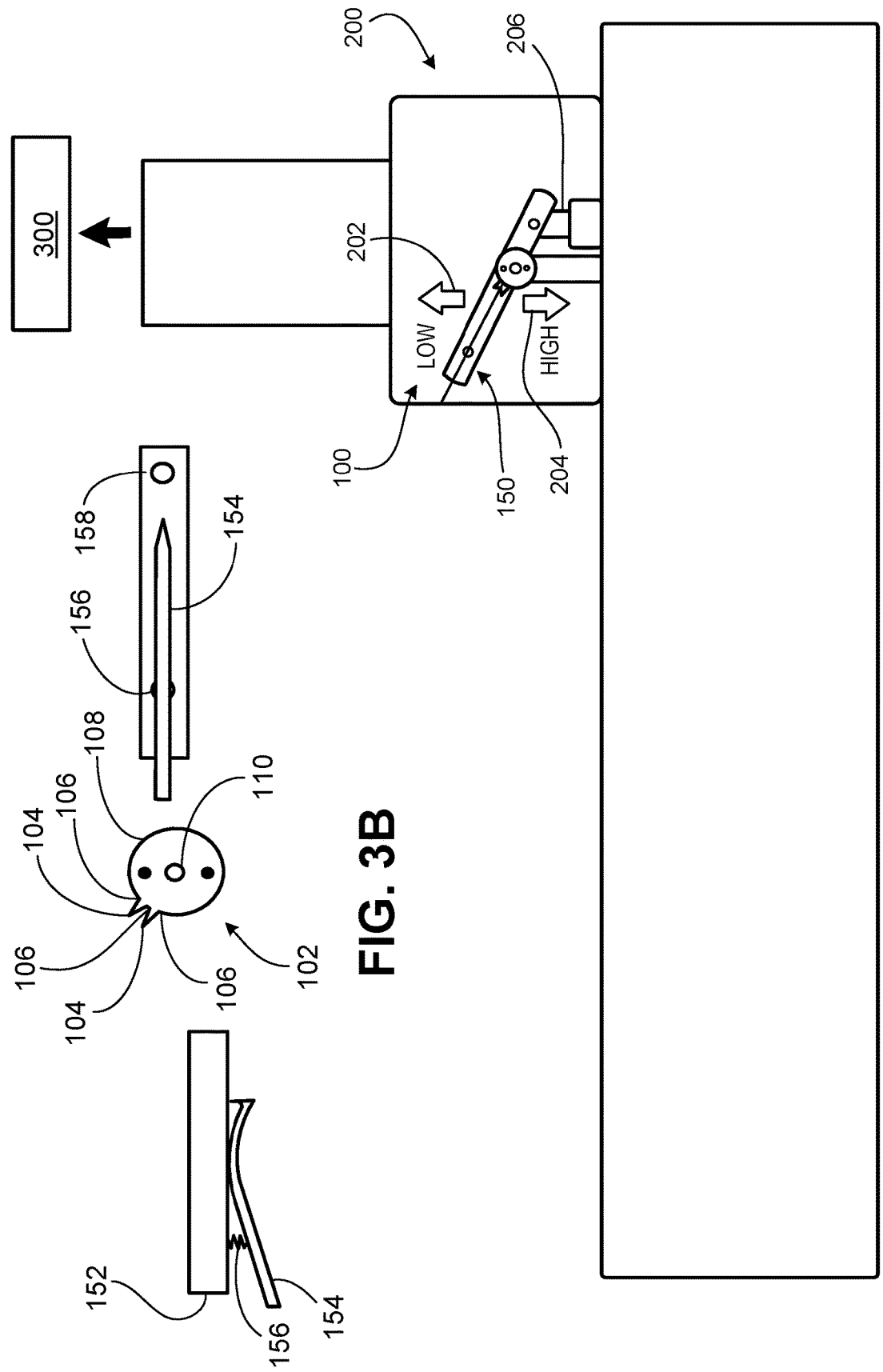

POWER TONG GEAR SHIFT SYSTEMS AND METHODS

TECHNICAL FIELD

This disclosure relates to a power tong gear shift locking assembly.

BACKGROUND

Tubular running service (TRS) is one of many services provided in drilling and workover operations. A power tong is particular tool utilized in the TRS. Power tongs are often considered unsafe equipment, because such tools may shift (e.g., accidentally) between a low speed gear setting and a high speed gear setting. Potential injuries could occur in such accidental shifting operations.

SUMMARY

This disclosure describes implementations of a power tong gear shift locking assembly. In some aspects, the power tong gear shift locking assembly may include a moveable handle that is lockable into one of many unique, discrete positions, with at least one of the discrete positions corresponding to a particular gear setting of the power tongs. When locked into one of the many unique, discrete positions, a gear setting of the power tongs may not be accidentally changed, such as through vibration or other mishap.

In an example implementation, a power tong locking system includes a gear assembly that includes an aperture formed to receive a head shaft of a power tong gear shift system. The gear assembly further includes a plurality of discrete positions defined by notches formed between adjacent teeth arranged on a perimeter of the gear assembly. The power tong locking system further includes a lock arm assembly that includes a shift handle that includes an aperture formed to receive the head shaft of the power tong gear shift system adjacent the gear assembly, and a release handle rotatably coupled to the shift handle. The lock arm assembly is movable between a first position in which the release handle is secured in a first position of the plurality of discrete positions to lock the power tong gear shift system at a first gear setting and a second position of the plurality of discrete positions to lock the power tong gear shift system at a second gear setting that is different than the first gear setting.

In an aspect combinable with the example implementation, the first gear setting includes a low speed gear setting, and the second gear setting includes a high speed gear setting.

An aspect combinable with any of the previous aspects further includes a biasing member coupled between the shift handle and the release handle.

In an aspect combinable with any of the previous aspects, the biasing member includes a spring.

In an aspect combinable with any of the previous aspects, the biasing member is positioned to urge the release handle into locking engagement with at least one of the first or second discrete positions and apart from the shift handle.

In an aspect combinable with any of the previous aspects, at least a portion of the perimeter of the gear assembly includes a circular shape.

In an aspect combinable with any of the previous aspects, at least one of the aperture of the gear assembly or the aperture of the lock arm assembly includes a square shape.

In an aspect combinable with any of the previous aspects, the plurality of discrete positions include only the first position and the second position.

In another example implementation, a method for operating power tongs includes operating a power tong system; moving a shift handle of a lock arm assembly of a power tong locking assembly to adjust the power tong system from a first gear setting to a second gear setting different than the first gear setting; rotating a release handle of the lock arm assembly into a first position of a plurality of discrete positions formed on a gear assembly of the lock arm assembly to lock the power tong system into the first gear setting; moving the shift handle to adjust the power tong system from the first gear setting to the second gear setting; and rotating the release handle into the second position of the plurality of discrete positions formed on the gear assembly to lock the power tong system into the second gear setting.

In an aspect combinable with the example implementation, the first gear setting includes a low speed gear setting, and the second gear setting includes a high speed gear setting.

In an aspect combinable with any of the previous aspects, rotating the release handle of the lock arm assembly into the first position includes urging, with a biasing member coupled between the shift handle and the release handle, the release handle into locking engagement with a notch formed between adjacent teeth on a perimeter of the gear assembly.

In an aspect combinable with any of the previous aspects, the notch is associated with one of the discrete positons.

In an aspect combinable with any of the previous aspects, the biasing member includes a spring.

In an aspect combinable with any of the previous aspects, rotating the release handle into the second position includes urging, with the biasing member, the release handle into locking engagement with another notch formed between adjacent teeth on the perimeter of the gear assembly.

In an aspect combinable with any of the previous aspects, the another notch is associated with another of the discrete positons.

In an aspect combinable with any of the previous aspects, at least a portion of the perimeter of the gear assembly includes a circular shape.

In an aspect combinable with any of the previous aspects, at least one of an aperture of the gear assembly or an aperture of the lock arm assembly includes a square shape to fit over a shaft of the power tong system.

In an aspect combinable with any of the previous aspects, the plurality of discrete positions include only the first position and the second position.

In another example implementation, a power tong system for making up tubulars of a hydrocarbon production system includes a set of power tongs; a power tong gear shift assembly coupled to the set of power tongs; and a power tong locking system coupled to the power tong gear shift assembly. The power tong locking system includes a gear assembly that includes an aperture formed to receive a head shaft of the power tong gear shift assembly and a lock arm assembly. The gear assembly further includes a plurality of discrete positions defined by notches formed between adjacent teeth arranged on a perimeter of the gear assembly. The lock arm assembly includes a shift handle that includes an aperture formed to receive the head shaft of the power tong gear shift assembly adjacent the gear assembly, and a release handle rotatably coupled to the shift handle. The lock arm assembly is movable between a first position in which the release handle is secured in a first position of the plurality of discrete positions to lock the power tong gear shift assembly at a first gear setting and a second position of the plurality of discrete positions to lock the power tong gear shift assembly at a second gear setting that is different than the first gear setting.

In an aspect combinable with the example implementation, the first gear setting includes a low speed gear setting, and the second gear setting includes a high speed gear setting.

An aspect combinable with any of the previous aspects further includes a biasing member coupled between the shift handle and the release handle.

In an aspect combinable with any of the previous aspects, the biasing member includes a spring.

In an aspect combinable with any of the previous aspects, the biasing member is positioned to urge the release handle into locking engagement with at least one of the first or second discrete positions and apart from the shift handle.

In an aspect combinable with any of the previous aspects, at least a portion of the perimeter of the gear assembly includes a circular shape.

In an aspect combinable with any of the previous aspects, at least one of the aperture of the gear assembly or the aperture of the lock arm assembly includes a square shape.

In an aspect combinable with any of the previous aspects, the plurality of discrete positions include only the first position and the second position.

Implementations of a power tong gear shift locking assembly according to the present disclosure may include one or more of the following features. For example, the power tong gear shift locking assembly according to the present disclosure may require no or substantially no design changes to conventional hydraulic or mechanical power tong gear shift systems. As another example, the power tong gear shift locking assembly according to the present disclosure may be a cost efficient solution that prevents human injuries. As another example, the power tong gear shift locking assembly according to the present disclosure may eliminate or reduce a probability of accidental gear shifting of power tongs during a power tong break out operation caused by, e.g., poor condition of a spring retainer, high vibrations, or human error. As another example, the power tong gear shift locking assembly according to the present disclosure may also meet current American Petroleum Institute (API) safety standards.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 3A is a schematic diagram of a power tong gear shift locking assembly during an operation and coupled to a portion of a power tong gear vertical shift system according to the present disclosure.

FIG. 3B is an exploded view of a portion of a power tong gear shift locking assembly according to the present disclosure.

DETAILED DESCRIPTION

Figure 1:
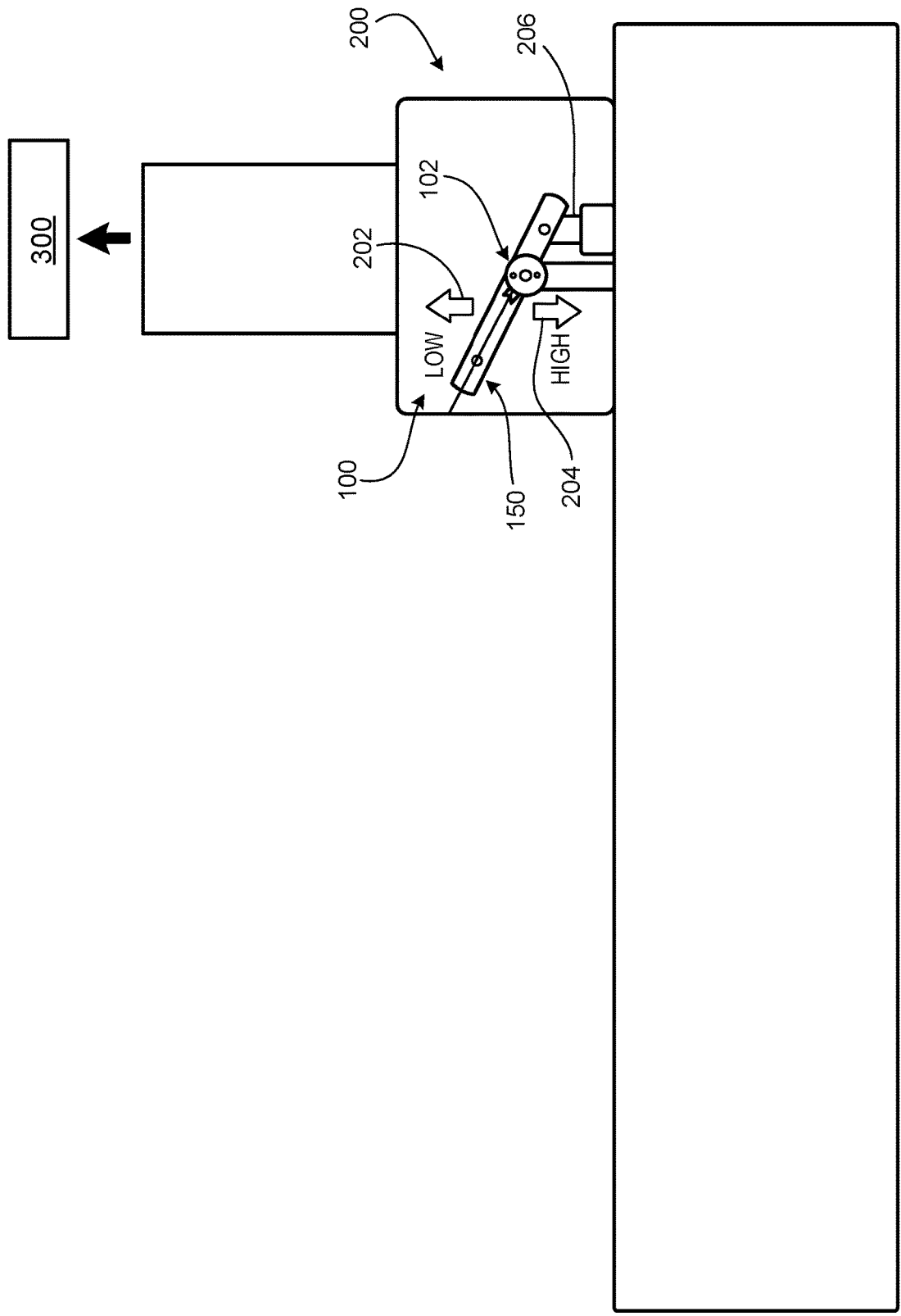
FIG. 1 is a schematic diagram of a power tong gear shift locking assembly coupled to a portion of a power tong gear shift system according to the present disclosure.

FIG. 1 is a schematic diagram of a power tong gear shift locking assembly 100 coupled to a portion of a power tong gear shift system 200. As shown in this example implementation, the power tongs gear shift system 200 is coupled to one or more pairs of power tongs, represented schematically as power tongs 300. Generally, power tongs 300 comprise a pair of tongs, i.e., wrenches, that are used to couple (e.g., "make up") or decouple (e.g., breakout) tubular joints during a hydrocarbon drilling or production operation. For example, the power tongs 300 may be a pair of makeup or breakout tongs that are comprises of one tong (i.e., wrench) that is stationary, such as tied off to a platform or rig, and another tong (i.e., wrench) to which power (e.g., mechanical, hydraulic) is applied to turn one tubular joint while the stationary tong acts as "backup" on another tubular joint. Generally, the power tongs 300 may be casing tongs, tubing tongs, drill pipe tongs, or riser tongs.

The power tongs gear shift system 200 is coupled to the power tongs 300 in order to transmit power at one or more gear settings. As shown in this example, the power tongs gear shift system 200 may be set at a "low" gear setting 202 and a "high" gear setting 204. Alternatively, the power tongs gear shift system 200 may include more than two gear settings. In some aspects, the gear setting may be set by a power tong operator based on, e.g., an amount of torque required by the power tongs 300 in order to perform the makeup or breakout operation. Switching gear settings during an operation with the power tongs 300, however, may cause damage to equipment and injury to the operator.

The power tongs gear shift system 200 includes a head shaft 206 that is rotatable to change the gear setting of the power tongs gear shift system 200 from, e.g., the low gear setting 202 to the high gear setting 204 (or vice versa). As shown in FIG. 1, the power tong gear shift locking assembly 100 includes a gear assembly 102 and a lock arm assembly 150, both of which fit over the head shaft 206. As shown, the gear assembly 102 includes a portion 108 in which the perimeter is circular or substantially circular.

Figure 2:
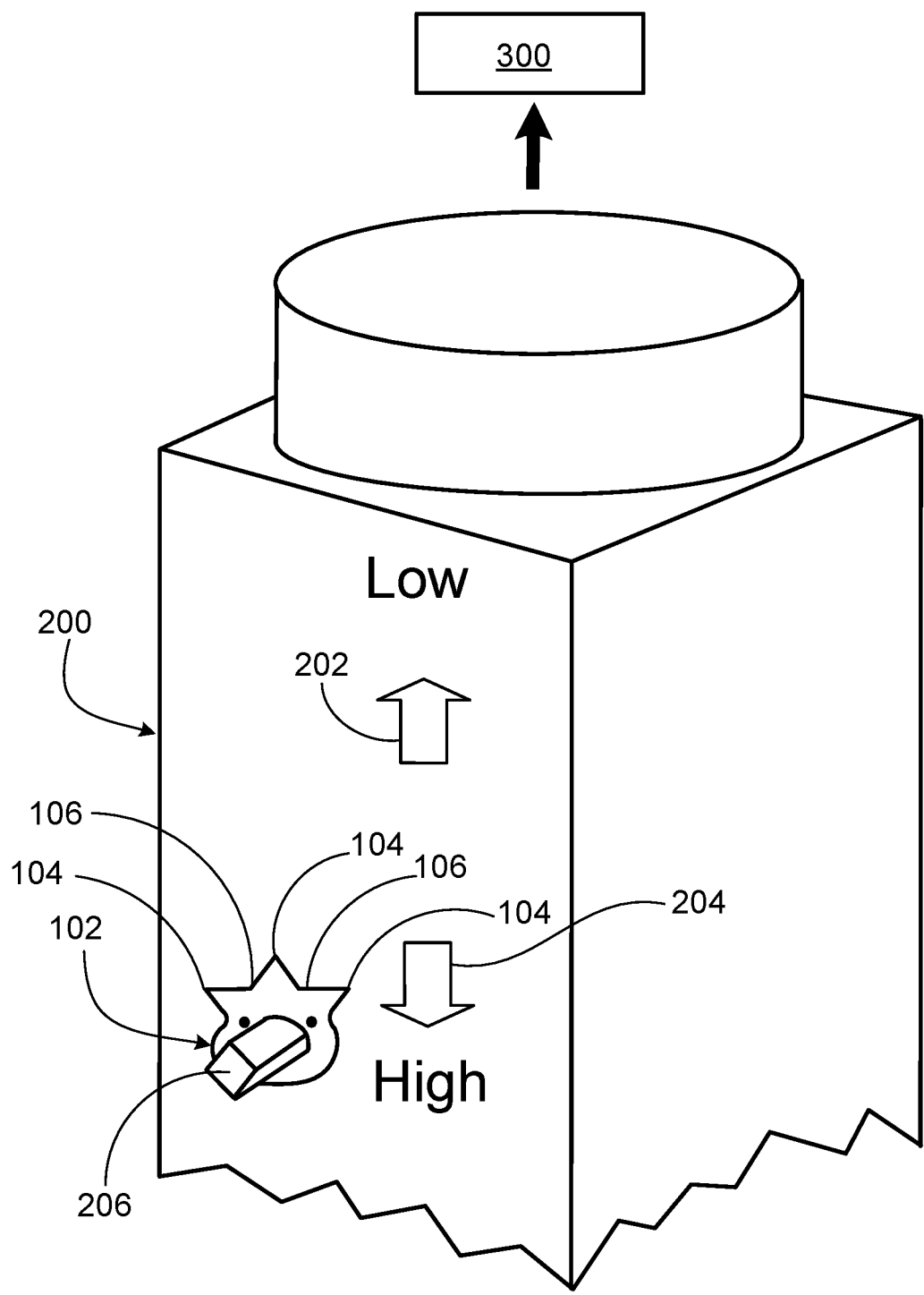
FIG. 2 is a schematic diagram of a portion of a power tong gear shift locking assembly coupled to a portion of a power tong gear horizontal shift system according to the present disclosure.

FIG. 2 is another schematic diagram of a portion of the power tong gear shift locking assembly 100 coupled to a portion of the power tong gear shift system 200 (e.g., a power tong gear horizontal shift system). As shown in this figure, the gear assembly 102 receives the head shaft 206 therethrough, thereby fitting over the head shaft 206 and adjacent a housing of the power tongs gear shift system 200. The gear assembly 102, in this example, incudes multiple teeth 104 and multiple notches 106. Each notch 106 is defined between two teeth 104, as shown. Thus, in this particular example, the gear assembly 102 includes three teeth 104 that define two notches 106. As explained more fully, each notch 106 may define a unique and discrete position in which at least a portion of the lock arm assembly 150 may be secured. When secured, the lock arm assembly 150 may prevent or substantially prevent a change to the gear setting of the power tongs gear shift system 200 during an operation of the power tongs 300.

FIG. 3A is a schematic diagram of the power tong gear shift locking assembly 100 during an operation of the power tongs 300 and coupled to a portion of the power tong gear shift system 200 (e.g., a power tong gear vertical shift system). FIG. 3B is an exploded view of a portion of the power tong gear shift locking assembly 100. As shown in these figures, the lock arm assembly 150 includes a shifter 152 and a release handle 154. The release handle 154 is pivotally coupled to the shifter 152 (e.g., at a hinge or pivot point). A biasing member 156 (e.g., a spring, elastic member, or other member that acts with a spring force) is also coupled between the shifter 152 and the release handle 154. The biasing member 156 is positioned to rotatably urge the release handle 154 away from the shifter 152. Thus, in this example, the spring force of the biasing member 156 is a compression type biasing member, in that a manual force is needed to urge the release handle 154 toward the shifter 152.

Each of the gear assembly 102 and the lock arm assembly 150 include an aperture to receive the head shaft 206 therethrough. The gear assembly 102 includes aperture 110, while the shifter 152 of the lock arm assembly 150 includes aperture 158. Although shown as particular shapes in these figures, the apertures 110 and 158 may be any appropriate shape (e.g., circular, square, keyed, or otherwise). In some aspects, the apertures 110 and 158 may be sized and shaped to tightly fit over the head shaft 206.

In an example operation, an operator of the power tongs 300 may engage the power tongs 300 by adjusting the shifter 152 to a particular gear setting, such as the low gear setting 202. In doing so, the operator may urge the release handle 154 toward the shifter 156, thereby compressing the biasing member 156. In urging the release handle 156 toward the shifter 152, the release handle 154 may decouple from secure engagement in a particular notch 106 (secured in the notch 106 by the adjacent teeth 104, which do not allow the release handle 154 to move from the notch 106). Once the release handle 154 is urged against the shifter 152, the lock arm assembly 150 may be rotated into the low gear setting 202. Once the operator has moved the lock arm assembly 105 into the low gear setting 202, the operator may stop or reduce urging the release handle 154 toward the shifter 152. The biasing member 156 may then overcome the operator's force and urge the release handle 154 into a secure, locking engagement with the particular notch 106 (i.e., the particular discrete position) that corresponds to the low gear setting 202. Once the operator releases the release handle 154, the shifter 152 (and lock arm assembly 150) is in a secure, locked position, and the power tongs 300 may not be accidentally moved from this low gear setting 202.

The operator may also move the lock arm assembly 150 from the low gear setting 202 to the high gear setting 204, when appropriate. For example, the operator may again urge the release handle 154 toward the shifter 156, thereby compressing the biasing member 156. In urging the release handle 156 toward the shifter 152, the release handle 154 may decouple from secure engagement with the particular notch 106 corresponding to the low gear setting 202. Once the release handle 154 is urged against the shifter 152, the lock arm assembly 150 may be rotated into the high gear setting 204. Once the operator has moved the lock arm assembly 105 into the high gear setting 204, the operator may stop or reduce urging the release handle 154 toward the shifter 152. The biasing member 156 may then overcome the operator's force and urge the release handle 154 into a secure, locking engagement with the particular notch 106 (i.e., the particular discrete position) that corresponds to the high gear setting 204. Once the operator releases the release handle 154, the shifter 152 (and lock arm assembly 150) is in a secure, locked position, and the power tongs 300 may not be accidentally moved from the high gear setting 204.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A power tong locking system, comprising:
a gear assembly that comprises an aperture formed to receive a head shaft of a power tong gear shift system, the gear assembly further comprising a plurality of discrete positions defined by notches formed between adjacent teeth arranged on a perimeter of the gear assembly, where at least a portion of the perimeter of the gear assembly comprises a circular shape; and
a lock arm assembly comprising:
a shift handle that comprises an aperture formed to receive the head shaft of the power tong gear shift system adjacent the gear assembly,
a release handle rotatably coupled to the shift handle, the lock arm assembly movable between a first position in which the release handle is secured in a first position of the plurality of discrete positions to lock the power tong gear shift system at a first gear setting and a second position of the plurality of discrete positions to lock the power tong gear shift system at a second gear setting that is different than the first gear setting, and
a biasing member that comprises a spring and is coupled between the shift handle and the release handle, the biasing member positioned to urge the release handle into contact, and in locking engagement with, at least one of the first or second discrete positions and to urge the release handle apart from the shift handle,
wherein at least one of the aperture of the gear assembly or the aperture of the lock arm assembly comprises a square shape, and the plurality of discrete positions comprise only the first position and the second position.

2. The power tong locking system of claim 1, wherein the first gear setting comprises a low speed gear setting, and the second gear setting comprises a high speed gear setting.

3. The power tong locking system of claim 1, wherein most of the perimeter of the gear assembly comprises a circular shape.

4. The power tong locking system of claim 1, wherein both of the aperture of the gear assembly and the aperture of the lock arm assembly comprise the square shape.

5. A method for operating power tongs, comprising:
operating a power tong system;
moving a shift handle of a lock arm assembly of a power tong locking assembly to adjust the power tong system from a first gear setting to a second gear setting different than the first gear setting;
rotating a release handle of the lock arm assembly into a first position of a plurality of discrete positions formed on a perimeter of a gear assembly of the lock arm assembly to lock the power tong system into the first gear setting, where at least a portion of the perimeter of the gear assembly comprises a circular shape, and at least one of the aperture of the gear assembly or an aperture of the lock arm assembly comprises a square shape, and where rotating the release handle of the lock arm assembly into the first position comprises:

urging, with a biasing member that comprises a spring and is coupled between the shift handle and the release handle, the release handle into locking engagement with a notch formed between adjacent teeth on the perimeter of the gear assembly, and urging, with the biasing member, the release handle apart from the shift handle, the notch associated with one of the discrete positons;

moving the shift handle to adjust the power tong system from the first gear setting to the second gear setting; and rotating the release handle into the second position of the plurality of discrete positions formed on the gear assembly to lock the power tong system into the second gear setting, the plurality of discrete positions comprising only the first position and the second position.

6. The method of claim 5, wherein the first gear setting comprises a low speed gear setting, and the second gear setting comprises a high speed gear setting.

7. The method of claim 6, wherein rotating the release handle into the second position comprises:

urging, with the biasing member, the release handle into locking engagement with another notch formed between adjacent teeth on the perimeter of the gear assembly, the another notch associated with another of the discrete positons.

8. The method of claim 7, wherein most of the perimeter of the gear assembly is the circular shape.

9. The method of claim 8, wherein both of the aperture of the gear assembly and the aperture of the lock arm assembly comprises the square shape to fit over the shaft of the power tong system.

10. The method of claim 5, wherein the biasing member is the spring.

11. The method of claim 10, wherein rotating the release handle into the second position comprises:

urging, with the biasing member, the release handle into locking engagement with another notch formed between adjacent teeth on the perimeter of the gear assembly, the another notch associated with another of the discrete positons.

12. The method of claim 5, wherein rotating the release handle into the second position comprises:

urging, with the biasing member, the release handle into locking engagement with another notch formed between adjacent teeth on the perimeter of the gear assembly, the another notch associated with another of the discrete positons.

13. The method of claim 5, wherein most of the perimeter of the gear assembly comprises the circular shape.

14. The method of claim 5, wherein both of the aperture of the gear assembly and the aperture of the lock arm assembly comprises the square shape to fit over the shaft of the power tong system.

15. A power tong system for making up tubulars of a hydrocarbon production system, comprising:

a set of power tongs;

a power tong gear shift assembly coupled to the set of power tongs; and a power tong locking system coupled to the power tong gear shift assembly, the power tong locking system comprising:

a gear assembly that comprises an aperture formed to receive a head shaft of the power tong gear shift assembly, the gear assembly further comprising a plurality of discrete positions defined by notches formed between adjacent teeth arranged on a perimeter of the gear assembly, where at least a portion of the perimeter of the gear assembly comprises a circular shape; and a lock arm assembly comprising:

a shift handle that comprises an aperture formed to receive the head shaft of the power tong gear shift assembly adjacent the gear assembly, a release handle rotatably coupled to the shift handle, the lock arm assembly movable between a first position in which the release handle is secured in a first position of the plurality of discrete positions to lock the power tong gear shift assembly at a first gear setting and a second position of the plurality of discrete positions to lock the power tong gear shift assembly at a second gear setting that is different than the first gear setting; and a biasing member that comprises a spring and is coupled between the shift handle and the release handle, the biasing member positioned to urge the release handle into locking engagement with at least one of the first or second discrete positions and to urge the release handle apart from the shift handle, wherein at least one of the aperture of the gear assembly or the aperture of the lock arm assembly comprises a square shape, and the plurality of discrete positions comprise only the first position and the second position.

16. The power tong system of claim 15, wherein the first gear setting comprises a low speed gear setting, and the second gear setting comprises a high speed gear setting.

17. The power tong system of claim 15, wherein the biasing member is a spring.

18. The power tong system of claim 15, wherein most of the perimeter of the gear assembly comprises the circular shape.

19. The power tong system of claim 18, wherein the biasing member is the spring.

20. The power tong system of claim 19, wherein the first gear setting comprises a low speed gear setting, and the second gear setting comprises a high speed gear setting.

21. The power tong system of claim 15, wherein both of the aperture of the gear assembly and the aperture of the lock arm assembly comprises the square shape.

* * * * *